US012463408B2

(12) United States Patent
Gendill

(10) Patent No.: US 12,463,408 B2
(45) Date of Patent: Nov. 4, 2025

(54) ELECTRICAL OUTLET MOUNTING DEVICE

(71) Applicant: Jim Gendill, Edmond, OK (US)

(72) Inventor: Jim Gendill, Edmond, OK (US)

( * ) Notice: Subject to any disclaimer, the term of this patent is extended or adjusted under 35 U.S.C. 154(b) by 39 days.

(21) Appl. No.: 18/399,152

(22) Filed: Dec. 28, 2023

(65) Prior Publication Data

US 2025/0219374 A1 Jul. 3, 2025

(51) Int. Cl.
*H02G 3/12* (2006.01)
*F16B 5/02* (2006.01)

(52) U.S. Cl.
CPC ........... *H02G 3/123* (2013.01); *F16B 5/0225* (2013.01)

(58) Field of Classification Search
CPC .......... H02G 3/123; H02G 3/10; H02G 3/125; H02G 3/121; F16B 5/0225; F16B 5/0216; F16B 5/02; F16B 5/0233
USPC ..... 220/3.3, 3.5, 3.7; 248/122.1, 125.8, 126, 248/256, 257, 265, 269
See application file for complete search history.

(56) References Cited

U.S. PATENT DOCUMENTS

| | | | | |
|---|---|---|---|---|
| 2,788,188 | A * | 4/1957 | Smith | H02G 3/126 248/57 |
| 2,980,756 | A | 4/1961 | Kelleher | |
| 3,432,793 | A | 3/1969 | Muska | |
| 3,440,590 | A | 4/1969 | Post | |
| 3,467,939 | A | 9/1969 | Martin | |
| 3,713,071 | A | 1/1973 | Poliak | |
| 5,386,959 | A * | 2/1995 | Laughlin | H02G 3/125 248/200.1 |
| 7,271,336 | B2 * | 9/2007 | Dinh | H02G 3/125 174/53 |
| 7,521,631 | B2 * | 4/2009 | Dinh | H02G 3/125 174/480 |
| 9,929,549 | B2 * | 3/2018 | Witherbee | F16M 13/022 |
| 10,135,232 | B2 * | 11/2018 | Nikayin | H02G 3/125 |
| 11,349,290 | B2 * | 5/2022 | Zhang | F21V 21/03 |
| 11,764,559 | B2 * | 9/2023 | Garvin | H02G 3/125 174/58 |
| 11,784,478 | B1 * | 10/2023 | Nassim | H02G 1/00 174/502 |
| 2008/0224006 | A1 * | 9/2008 | Call | H02G 3/125 248/231.91 |
| 2019/0044313 | A1 * | 2/2019 | Momin | H02G 3/20 |
| 2021/0281056 | A1 * | 9/2021 | Oh | H02G 3/20 |
| 2022/0030731 | A1 * | 1/2022 | Oh | H02G 3/126 |
| 2022/0196185 | A1 * | 6/2022 | Guyatt | F16L 3/2235 |

FOREIGN PATENT DOCUMENTS

| | | |
|---|---|---|
| GB | 2607559 | * 12/2022 |

* cited by examiner

*Primary Examiner* — Rafael A Ortiz

(57) ABSTRACT

An electrical outlet mounting device includes a bracket and fixed arm attached to the bracket and a slidably adjustable arm that is slidable in the bracket such that the bracket has an adjustable width. The bracket is positionable to extend laterally across an outlet opening in a drywall panel. A screw is extendable through the slidably adjustable arm and threadably engages the bracket to retaining the slidably adjustable arm at a selected position in the bracket. A mounting screw of an electrical outlet is extendable through the slidably adjustable arm for attaching the electrical outlet to the bracket. In this way the bracket can mount the electrical outlet in an electrical box that is surrounded by the outlet opening in the drywall panel.

7 Claims, 6 Drawing Sheets

ELECTRICAL OUTLET MOUNTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to outlet mounting devices and more particularly pertains to a new outlet mounting device for mounting an electrical outlet in an electrical box that is surrounded by an outlet hole in a drywall panel. The device includes a bracket and a slidably adjustable arm that is slidably attached to the bracket and a fixed arm attached to the bracket. The slidably adjustable arm includes a foot and the fixed arm includes a foot and the foot of the slidably adjustable arm and the foot of the fixed arm abuts an exposed surface of the drywall when the bracket is positioned to extend across the outlet hole. The device includes a screw that extends through the slidably adjustable arm and engages the bracket for retaining the slidably adjustable arms at a selected width.

(2) Description of Related Art Including Information Disclosed Under 37 CFR 1.97 and 1.98

The prior art relates to outlet mounting devices including a variety of grounding straps for improving electrical communication between an outlet and a ground and a fastener device for an electrical outlet that has a split head and a wedge insertable into the split head and an outlet leveler device that includes a fastener and a compressible sleeve positioned around the fastener. In no instance does the prior art disclose an electrical outlet mounting device that includes a bracket and a slidably adjustable arm that are slidably integrated into the bracket which each includes a foot which rests against a drywall panel and a screw for retaining each of the slidably adjustable arm at a selected width.

BRIEF SUMMARY OF THE INVENTION

An embodiment of the disclosure meets the needs presented above by generally comprising a bracket and fixed arm attached to the bracket and a slidably adjustable arm that is slidable in the bracket such that the bracket has an adjustable width. The bracket is positionable to extend laterally across an outlet opening in a drywall panel. A screw is extendable through the slidably adjustable arm and threadably engages the bracket to retaining the slidably adjustable arm at a selected position in the bracket. A mounting screw of an electrical outlet is extendable through the slidably adjustable arm for attaching the electrical outlet to the bracket. In this way the bracket can mount the electrical outlet in an electrical box that is surrounded by the outlet opening in the drywall panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
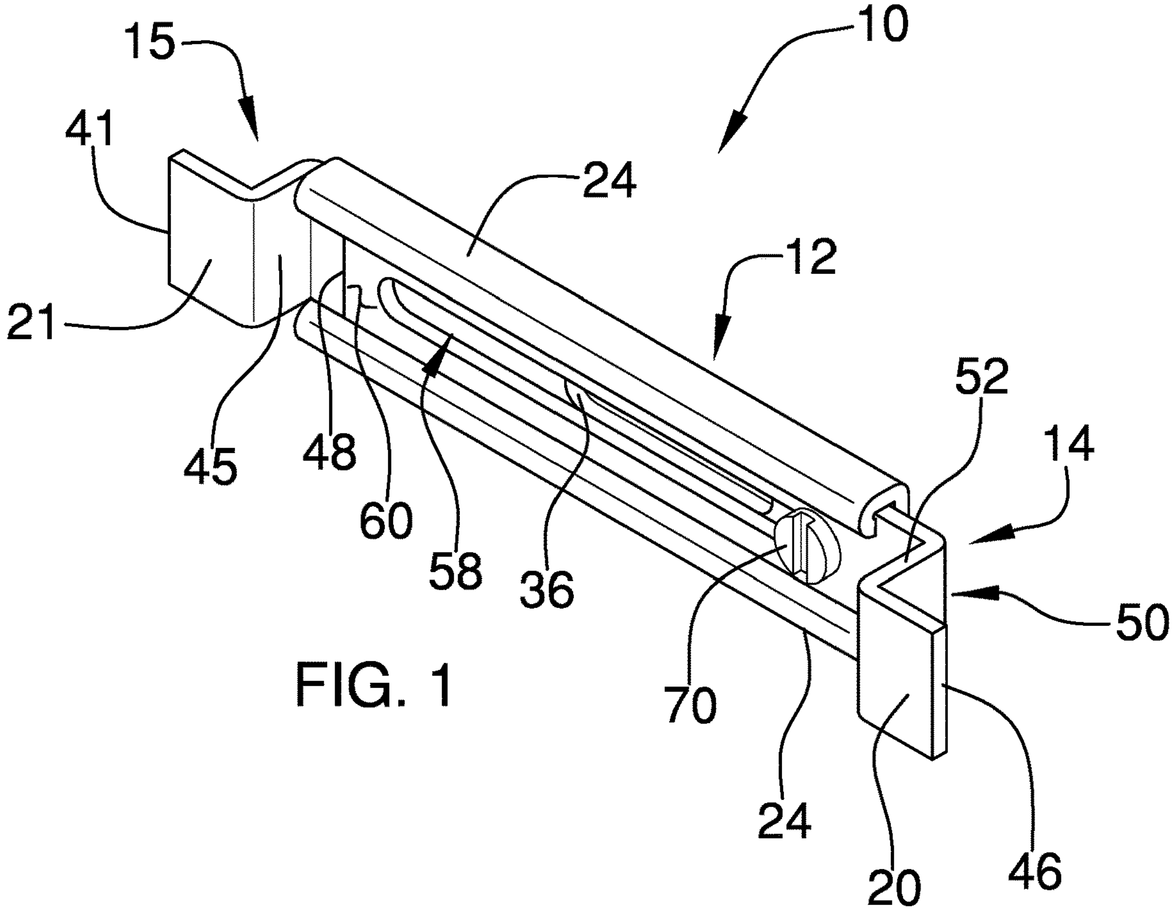
FIG. 1 is a perspective view of an electrical outlet mounting device according to an embodiment of the disclosure.
Figure 2:
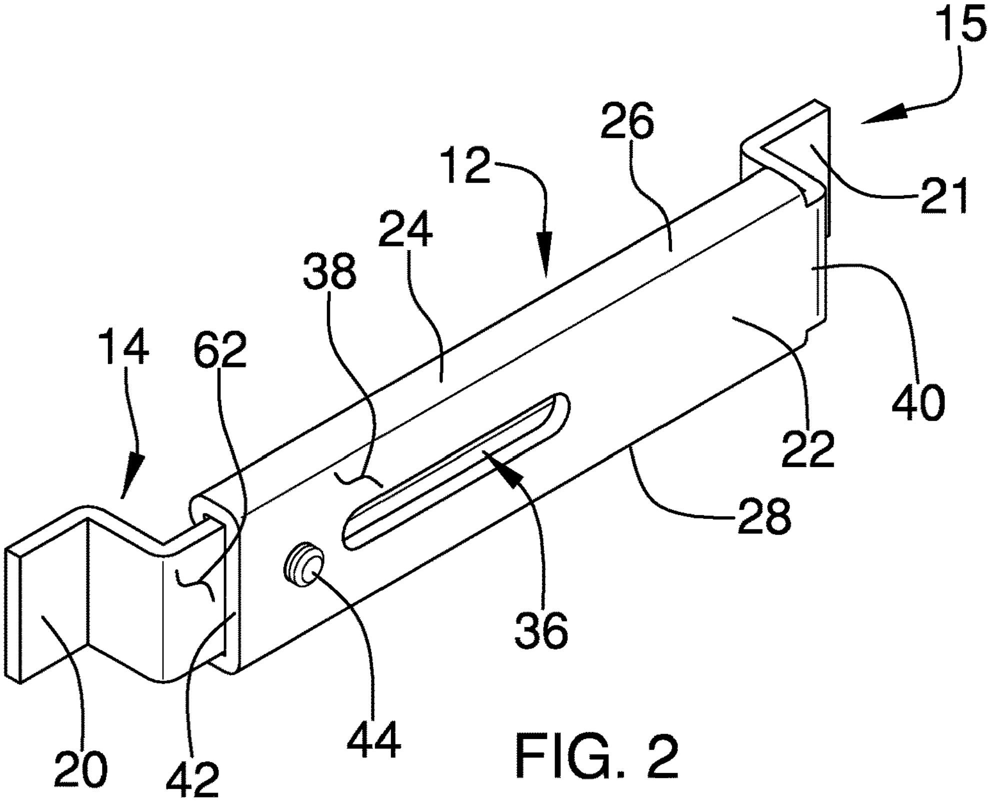
FIG. 2 is a back perspective view of an embodiment of the disclosure.
Figure 3:
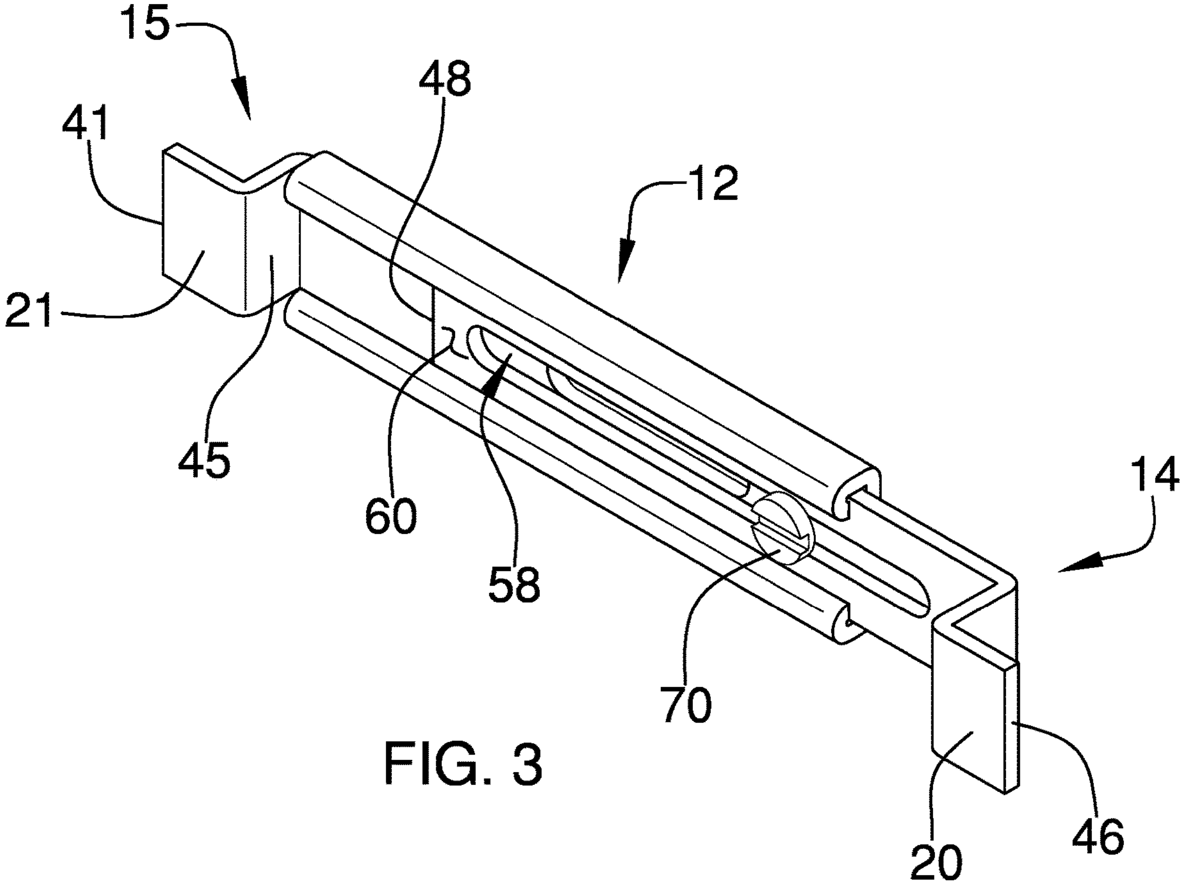
FIG. 3 is a front perspective view of an embodiment of the disclosure.
Figure 4:
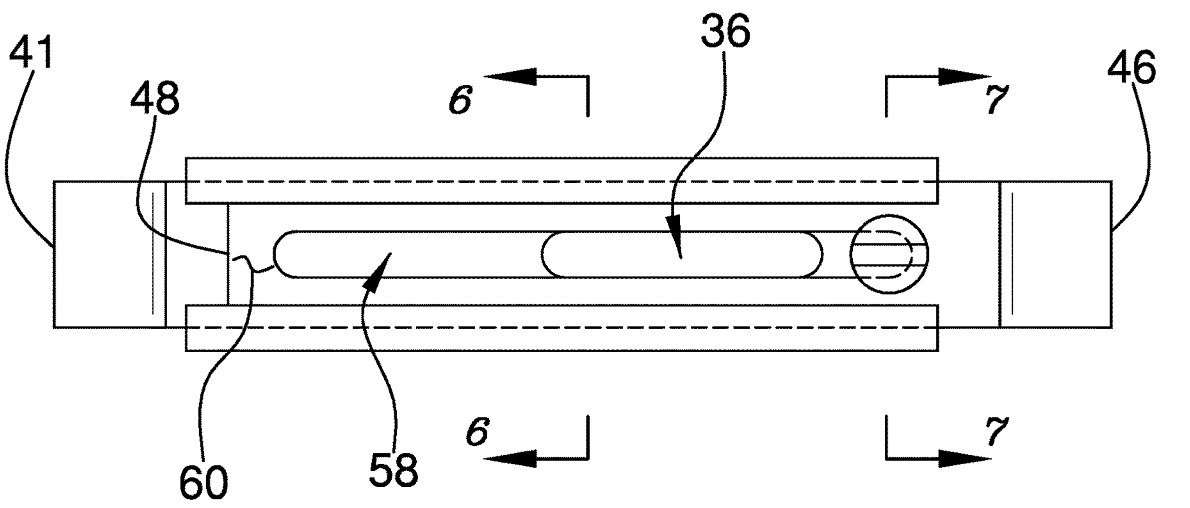
FIG. 4 is a front phantom view of an embodiment of the disclosure.
Figure 5:
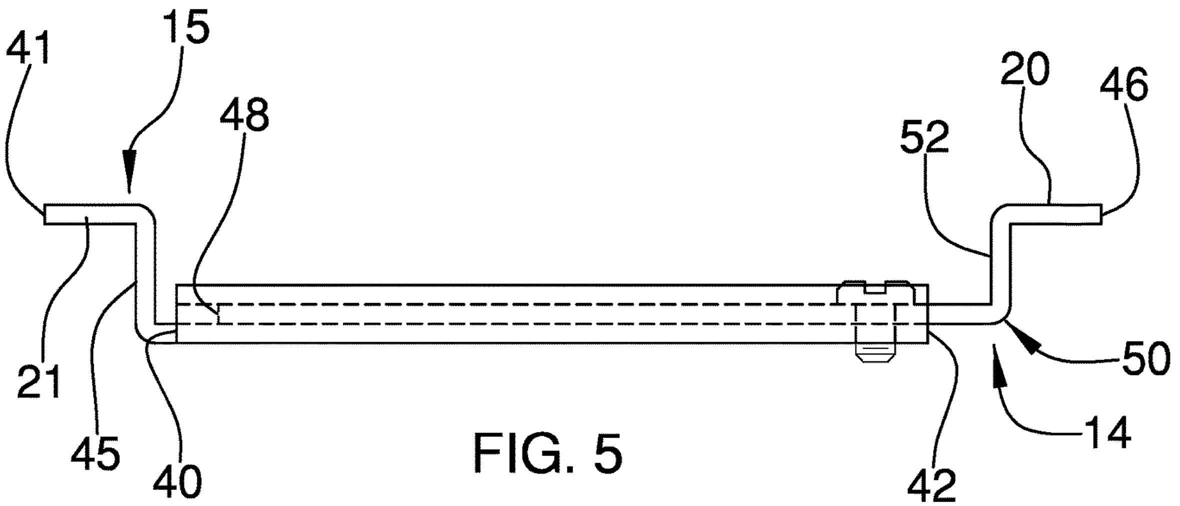
FIG. 5 is a top phantom view of an embodiment of the disclosure.
Figure 6:
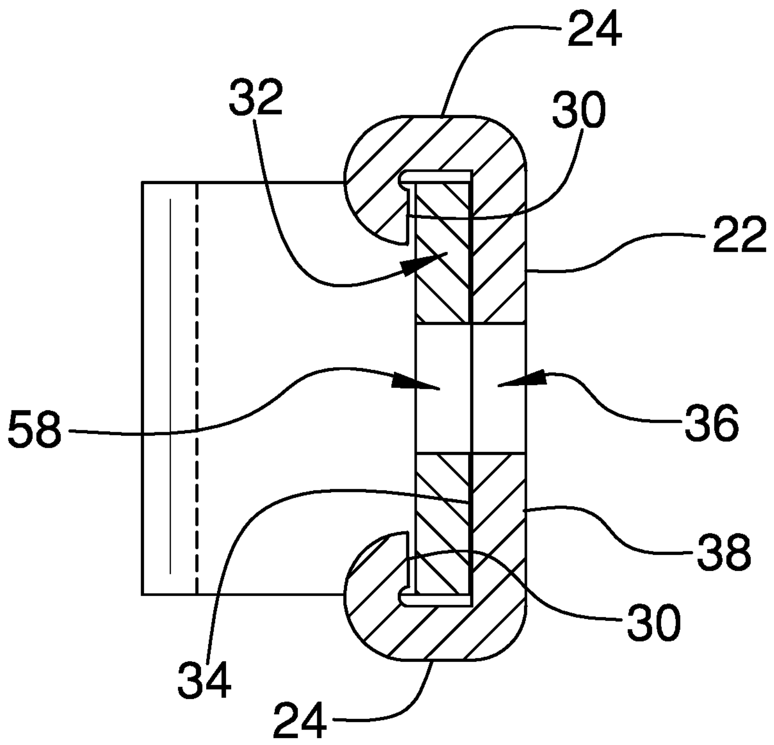
FIG. 6 is a cross sectional view taken along line 6-6 of FIG. 4 of an embodiment of the disclosure.
Figure 7:
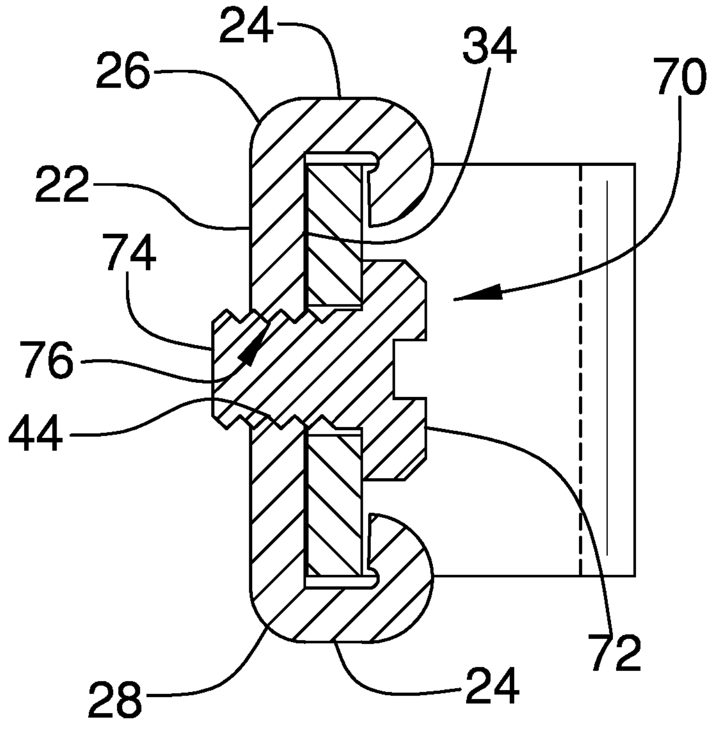
FIG. 7 is a cross sectional view taken along line 7-7 of FIG. 4 of an embodiment of the disclosure.
Figure 8:
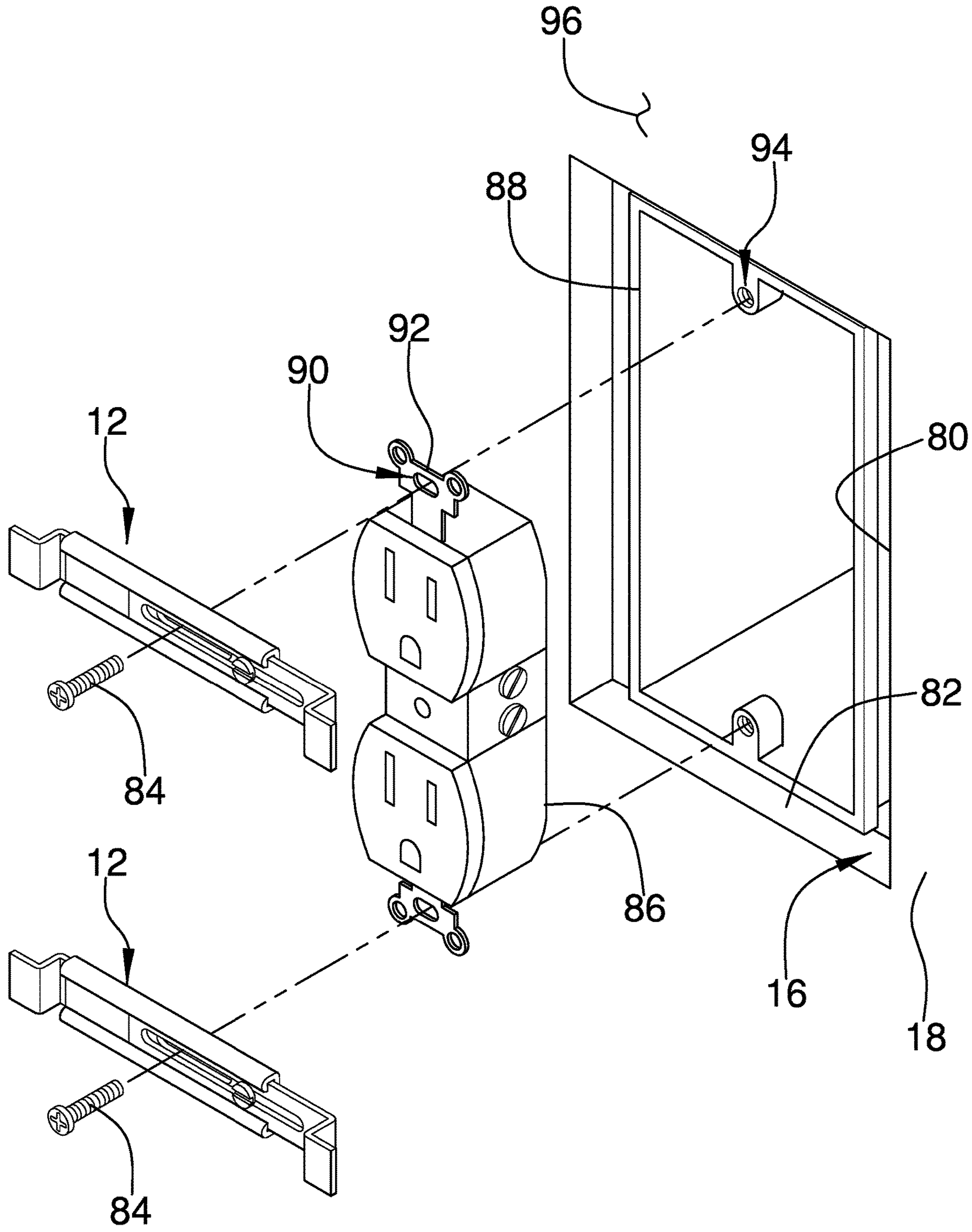
FIG. 8 is an exploded in-use view of an embodiment of the disclosure.
Figure 9:
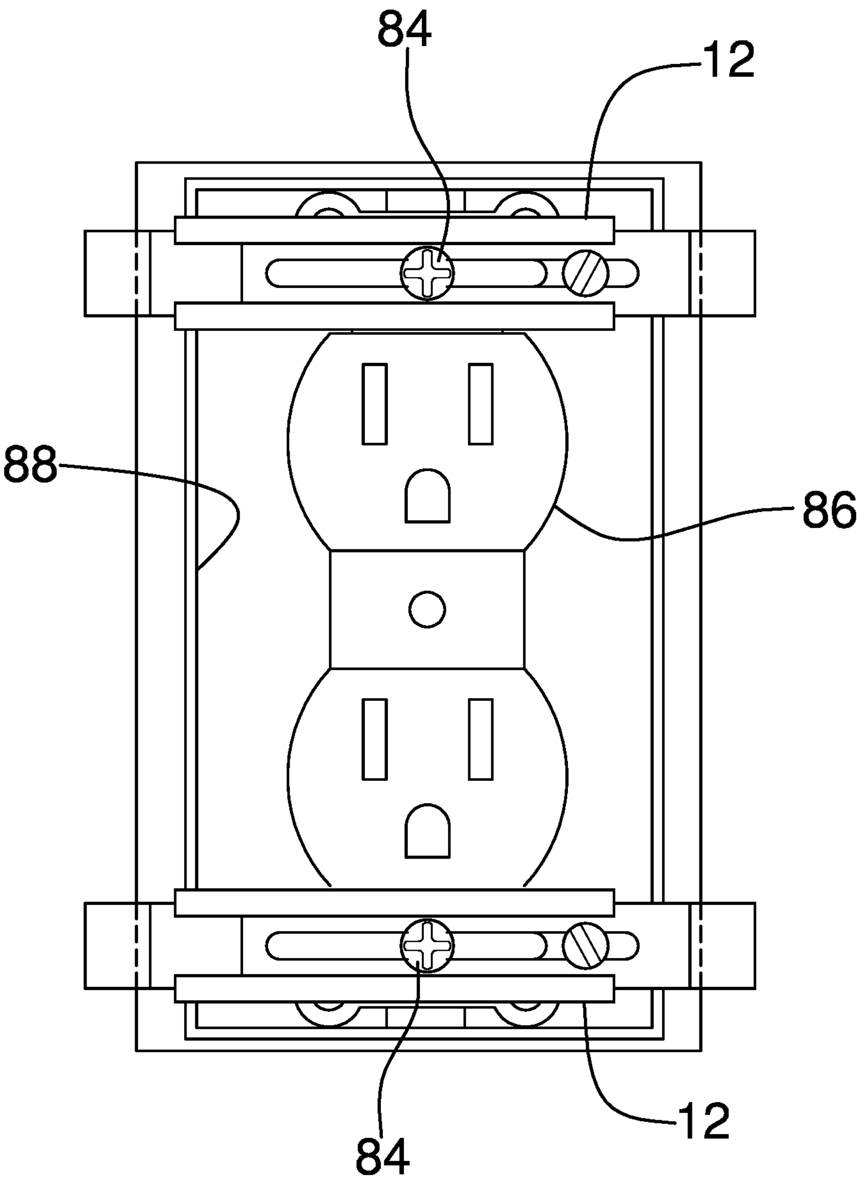
FIG. 9 is a perspective in-use view of an embodiment of the disclosure.

With reference now to the drawings, and in particular to FIGS. 1 through 9 thereof, a new outlet mounting device embodying the principles and concepts of an embodiment of the disclosure and generally designated by the reference numeral 10 will be described.

As best illustrated in FIGS. 1 through 9, the electrical outlet mounting device 10 generally comprises a bracket 12 that has a slidably adjustable arm 14 and a fixed arm 15. The slidably adjustable arm 14 is slidable in the bracket 12 such that the bracket 12 has an adjustable width. In this way the bracket 12 can be positioned to extend laterally across an outlet opening 16 that has been cut into a drywall panel 18. The slidably adjustable arm 14 has a foot 20 which rests against the drywall panel 18 when the bracket 12 is positioned to extend laterally across the outlet opening 16. Additionally, the fixed arm 15 has a foot 21 which rests against the drywall panel 18 when the bracket 12 is positioned to extend laterally across the outlet opening 16. In this way the bracket 12 is inhibited from falling through the outlet opening 16.

The bracket 12 has a rear panel 22 and a pair of perimeter panels 24 each extending forwardly from the rear panel 22. Each of the perimeter panels 24 is perpendicularly oriented with the rear panel 22 having each of the pair of perimeter panels 24 being aligned with a respective one of an upper edge 26 and a lower edge 28 of the rear panel 22 such that the bracket 12 defines a U-shape. Additionally, each of the pair of perimeter panels 24 curves toward the rear panel 22 at a point located adjacent to a distal edge 30 of the perimeter panels 24 thereby defining a slide space 32 between the distal edge 30 of each of the pair of perimeter panels 24 and a forward surface 34 of the rear panel 22.

The bracket 12 has a first slot 36 extending through the forward surface 34 and a rear surface 38 of the rear panel 22 and the first slot 36 is elongated along an axis extending between a first lateral edge 40 and a second lateral edge 42 of the rear panel 22. Additionally, the first slot 36 is positioned closer to the first lateral edge 40 than the second lateral edge 42. The bracket 12 has a screw hole 44 extending through the forward surface 34 and the rear surface 38 of the rear panel 22. The screw hole 44 is positioned between the first slot 36 and the first lateral edge 40 of the rear panel 22.

The slidably adjustable arm 14 has a first end 46 and a second end 48 and the slidably adjustable arm 14 is elongated between the first end 46 and the second end 48. Additionally, the slidably adjustable arm 14 has a bend 50 which is positioned closer to the first end 46 than the second end 48 to define a leg 52 and the foot 20 each extending away from said slidably adjustable arm 14. The foot 20 of the slidably adjustable arm 14 is associated with the first end 46 of the slidably adjustable arm 14. The slidably adjustable arm 14 has a second slot 58 extending through a front surface 60 and back surface 62 of the slidably adjustable arm 14 and the second slot 58 is elongated to extend substantially between the second end 48 of the slidably adjustable arm 14 and the bend 50 in the slidably adjustable arm 14. The second end 48 of the slidably adjustable arm 14 is insertable into the slide space 32 defined in the bracket 12 adjacent to the first lateral edge 40 of the rear panel 22 of the bracket 12 having the back surface 62 of the slidably adjustable arm 14 resting against the forward surface 34 of the rear panel 22 of the bracket 12.

The fixed arm 15 extends away from the second lateral edge 42 of the rear panel 22 of the bracket 12 and the fixed arm 15 has a distal end 41 with respect to the second lateral edge 42. The fixed arm 15 has a bend 43 which is positioned closer to the second lateral edge 42 than the distal end 41 to define a leg 45 and the foot 21 of the fixed arm 15 which each extends away from the fixed arm 15. Furthermore, the foot 21 of the fixed arm 15 is associated with the distal end 41 of the fixed arm 15.

The second slot 58 is aligned with the first slot 36 in the rear panel 22 of the bracket 12. Furthermore, the screw hole 44 in the rear panel 22 of the bracket 12 is aligned with the second slot 58. The leg 52 defined on the slidably adjustable arm 14 is directed forwardly with respect to the bracket 12 having the foot 20 defined on the slidably adjustable arm 14 lying on a plane that is oriented parallel to the rear panel 22 of the bracket 12. Additionally, the leg 52 defined on the slidably adjustable arm 14 and the leg 52 defined on the fixed arm 15 may have a depth ranging between approximately 6.0 mm and 8.0 mm.

A screw 70 is extendable through the slidably adjustable arm 14 and threadably engages the bracket 12 for retaining the slidably adjustable arm 14 at a selected position in the bracket 12 when the screw 70 is tightened. Conversely, the slidably adjustable arm 14 is slidable in the bracket 12 when the screw 70 is loosened. The screw 70 has a head 72 and a shaft 74 that is threaded and the shaft 74 is extendable through each of the second slot 58 in the slidably adjustable arm 14. Furthermore, the shaft 74 extends through the screw hole 44 in the rear panel 22 of the bracket 12 having the shaft 74 threadably engaging a bounding edge 76 of the screw hole 44.

The head 72 compresses against the front surface 60 of the slidably adjustable arm 14 thereby compressing the back surface 62 of the slidably adjustable arm 14 against the forward surface 34 of the rear panel 22 of the bracket 12 when the screw 70 is tightened. Conversely, the head 72 decompresses from the front surface 60 of the slidably adjustable arm 14 when the screw 70 is loosened. The slidably adjustable arm 14 is slid outwardly from the bracket 12 until the leg 52 defined on the slidably adjustable arm 14 and the leg 45 defined on the fixed arm 15 abuts a respective one of a first lateral side 78 and a second lateral side 80 of a bounding edge 82 of the outlet opening 16 in the drywall panel 18 when the screw 44 is loosened.

A mounting screw 84 of an electrical outlet 86 is extendable through the slidably adjustable arm 14 for attaching the electrical outlet 86 to the bracket 12. In this way the bracket 12 can mount the electrical outlet 86 in an electrical box 88 that is surrounded by the outlet opening 16 in the drywall panel 18. The mounting screw 84 is extendable through the second slot 58 in the slidably adjustable arm 14 and the first slot 36 in the rear panel 22 of the bracket 12 and a screw hole 90 in a respective support bracket 92 of the electrical outlet 86. Furthermore, the mounting screw 84 is threaded into a respective screw hole 94 in the electrical box 88 until the foot 20 the slidably adjustable arm 14 and the foot 21 on the fixed arm 15 is compressed against an exposed surface 96 of the drywall panel 18. As is most clearly shown in FIGS. 8 and 9, pair of the brackets 12 may be provided and each of the pair of brackets 12 is secured to the electrical outlet 86 and the electrical box 88 for mounting the electrical outlet 86 in the electrical box 88. The electrical outlet 86 may be an electrical outlet of any conventional design that is commonly employed in residential electrical wiring and the electrical box 88 may be an electrical box of any conventional design commonly employed in residential construction. Additionally, the drywall panel 18 may be a drywall panel of any conventional design that is employed to finish an interior wall of a house, for example, or other type of framed structure.

In use, the slidably adjustable arm 14 is slid outwardly from the bracket 12 until the leg 52 defined the slidably adjustable arm 14 and the leg 45 defined on the fixed arm 15 abuts the respective first lateral side 78 and second lateral side 80 of the bounding edge 82 of the outlet opening 16 in the drywall panel 18. The screw 44 in the bracket 12 is tightened to retain the slidably adjustable arm 14 at the desired width. The mounting screw 84 is extended through the second slot 58 and the first slot 36 in the rear panel 22 of the bracket 12 and the screw hole 90 in a respective support bracket 92 of the electrical outlet 86. The mounting screw 84 is subsequently threaded into the respective screw hole 94 in the electrical box 88 and tightened until the foot 20 defined on the slidably adjustable arm 14 and the foot 21 defined on the fixed arm 15 is compressed against the exposed surface 96 of the drywall panel 18. In this way the electrical outlet 86 is correctly positioned in the electrical box 88 to facilitate a face plate to be attached to the electrical outlet 86 regardless of whether the outlet opening 16 in the drywall panel 18 is too wide or too tall.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electrical outlet mounting device for mounting an electrical outlet in drywall when an outlet opening in the drywall has been cut larger than necessary, said device comprising:

a bracket having a slidably adjustable arm such that said bracket has an adjustable width thereby facilitating said bracket to be positioned to extend laterally across an outlet opening having been cut into a drywall panel, said bracket including a fixed arm, said slidably adjustable arm having a foot and said fixed arm having a foot, said foot of said slidably adjustable arm and said foot of said fixed arm rests against said drywall panel when said bracket is positioned to extend laterally across said outlet opening thereby inhibiting said bracket from falling through said outlet opening;

a screw being extendable through said slidably adjustable arm and threadably engaging said bracket for retaining said slidably adjustable arm at a selected position in said bracket when said screw is tightened, said slidably adjustable arm being slidable in said bracket when said screw is loosened;

wherein a mounting screw of an electrical outlet is extendable through said slidably adjustable arm for attaching said electrical outlet to said bracket thereby facilitating said bracket to mount said electrical outlet in an electrical box that is surrounded by said outlet opening in said drywall panel;

wherein said bracket has a rear panel and a pair of perimeter panels each extending forwardly from said rear panel;

wherein each of said perimeter panels being perpendicularly oriented with said rear panel having each of said pair of perimeter panels being aligned with a respective one of an upper edge and a lower edge of said rear panel such that said bracket defines a U-shape;

wherein each of said pair of perimeter panels curves toward said rear panel at a point located adjacent to a distal edge of said perimeter panels thereby defining a slide space between said distal edge of each of said pair of perimeter panels and a forward surface of said rear panel;

wherein said bracket has a first slot extending through said forward surface and a rear surface of said rear panel;

wherein said first slot is elongated along an axis extending between a first lateral edge and a second lateral edge of said rear panel;

wherein said first slot is positioned closer to said first lateral edge than said second lateral edge;

wherein said bracket has a screw hole extending through said forward surface and said rear surface of said rear panel;

wherein said screw hole is positioned between said first slot and said first lateral edge of said rear panel;

wherein said slidably adjustable arm has a first end and a second end;

wherein said slidably adjustable arm is elongated between said first end and said second end;

wherein said slidably adjustable arm has a bend being positioned closer to said first end than said second end to define a leg and said foot each extending away from said slidably adjustable arm;

wherein said foot of said slidably adjustable arm is associated with said first end of said respective slidably adjustable arm;

wherein said slidably adjustable arm has a second slot extending through a front surface and back surface of said slidably adjustable arm;

wherein said second slot is elongated to extend substantially between said second end of said slidably adjustable arm and said bend in said slidably adjustable arm; and wherein said second end of said slidably adjustable arm is insertable into said slide space defined in said bracket adjacent to said first lateral edge of said rear panel of said bracket having said back surface of said slidably adjustable arm resting against said forward surface of said rear panel of said bracket.

2. The device according to claim 1, wherein:

said fixed arm extends away from said second lateral edge of said rear panel of said bracket;

said fixed arm has a distal end with respect to said second lateral edge;

said fixed arm has a bend being positioned closer to said second lateral edge than said distal end to define a leg and said foot each extending away from said fixed arm; and said foot of said fixed arm is associated with said distal of said fixed arm.

3. The device according to claim 1, wherein said leg defined on said slidably adjustable arm and said leg defined on said fixed arm is directed forwardly with respect to said bracket having said foot defined on said slidably adjustable arm and said foot defined on said fixed arm lying on a plane being oriented parallel to said rear panel of said bracket.

4. The device according to claim 2, wherein:

said screw has a head and a shaft that is threaded;

said shaft is extendable through said second slot in said slidably adjustable arm;

said shaft extends through said screw hole in said rear panel of said bracket having said shaft threadably engaging a bounding edge of said screw hole;

said head compresses against said front surface of said slidably adjustable thereby compressing said back surface of said slidably adjustable arm against said forward surface of said rear panel of said bracket when said screw is tightened; and said head decompresses from said front surface of said slidably adjustable arm when said screw is loosened.

5. The device according to claim 1, wherein said slidably adjustable arm is slid outwardly from said bracket until said leg defined on said slidably adjustable arm said leg defined on said fixed arm abuts a respective one of a first lateral side and a second lateral side of a bounding edge of said outlet opening in said drywall panel when said screw is loosened.

6. The device according to claim 2, wherein said mounting screw is extendable through each said second slot in said slidably adjustable arm and said first slot in said rear panel of said bracket and a screw hole in a support bracket of said electrical outlet thereby facilitating said mounting screw to be threaded into a screw hole in said electrical box until said foot on said slidably adjustable arm and said foot on said fixed arm is compressed against an exposed surface of said drywall panel.

7. An electrical outlet mounting device for mounting an electrical outlet in drywall when an outlet opening in the drywall has been cut larger than necessary, said device comprising:

a bracket having a slidably adjustable arm such that said bracket has an adjustable width thereby facilitating said bracket to be positioned to extend laterally across an outlet opening having been cut into a drywall panel, said bracket including a fixed arm, said slidably adjustable arm having a foot and said fixed arm having a foot, said foot of said slidably adjustable arm and said foot of said fixed arm rests against said drywall panel when said bracket is positioned to extend laterally across said outlet opening thereby inhibiting said bracket from falling through said outlet opening;

wherein said bracket has a rear panel and a pair of perimeter panels each extending forwardly from said rear panel, each of said perimeter panels being perpendicularly oriented with said rear panel having each of said pair of perimeter panels being aligned with a respective one of an upper edge and a lower edge of said rear panel such that said bracket defines a U-shape, each of said pair of perimeter panels curving toward said rear panel at a point located adjacent to a distal edge of said perimeter panels thereby defining a slide space between said distal edge of each of said pair of perimeter panels and a forward surface of said rear panel, said bracket having a first slot extending through said forward surface and a rear surface of said rear panel, said first slot being elongated along an axis extending between a first lateral edge and a second lateral edge of said rear panel, said first slot being positioned closer to said first lateral edge than said second lateral edge, said bracket having a screw hole extending through said forward surface and said rear surface of said rear panel, said screw hole being positioned between said first slot and said first lateral edge of said rear panel;

wherein said slidably adjustable arm has a first end and a second end, said slidably adjustable arm being elongated between said first end and said second end, said slidably adjustable arm having a bend being positioned closer to said first end than said second end to define a leg and said foot each extending away from said slidably adjustable arm, said foot of said slidably adjustable arm being associated with said first end of said slidably adjustable arm, said slidably adjustable arm having a second slot extending through a front surface and back surface of said slidably adjustable arm, said second slot being elongated to extend substantially between said second end of said slidably adjustable arm and said bend in said slidably adjustable arm, said second end of said slidably adjustable arm being insertable into said slide space defined in said bracket adjacent to said first lateral edge of said rear panel of said bracket having said back surface of said slidably adjustable arm resting against said forward surface of said rear panel of said bracket, said second slot being aligned with said first slot in said rear panel of said bracket, said screw hole in said rear panel of said bracket being aligned with said second slot;

wherein said fixed arm extends away from said second lateral edge of said rear panel of said bracket, said fixed arm having a distal end with respect to said second lateral edge, said fixed arm having a bend being positioned closer to said second lateral edge than said distal end to define a leg and said foot each extending away from said fixed arm, said foot of said fixed arm being associated with said distal of said fixed arm;

wherein said leg defined on said slidably adjustable arm and said leg defined on said fixed arm is directed forwardly with respect to said bracket having said foot defined on said slidably adjustable arm and said foot defined on said fixed arm lying on a plane being oriented parallel to said rear panel of said bracket; and a screw being extendable through said slidably adjustable arm and threadably engaging said bracket for retaining said slidably adjustable arm at a selected position in said bracket when said screw is tightened, said slidably adjustable arm being slidable in said bracket when said screw is loosened, said screw having a head and a shaft being threaded, said shaft being extendable through said second slot in said slidably adjustable arm, said shaft extending through said screw hole in said rear panel of said bracket having said shaft threadably engaging a bounding edge of said screw hole, said head compressing against said front surface of said slidably adjustable arm thereby compressing said back surface of said slidably adjustable arm against said forward surface of said rear panel of said bracket when said screw is tightened, said head decompressing from said front surface of said slidably adjustable arm when said screw is loosened, said slidably adjustable arm being slid outwardly from of said bracket until said leg defined on said slidably adjustable arm and said leg defined on said fixed arm abuts a respective one of a first lateral side and a second lateral side of a bounding edge of said outlet opening in said drywall panel when said screw is loosened; and wherein a mounting screw of an electrical outlet is extendable through said slidably adjustable arm for attaching said electrical outlet to said bracket thereby facilitating said bracket to mount said electrical outlet in an electrical box that is surrounded by said outlet opening in said drywall panel, said mounting screw being extendable through said second slot in said slidably adjustable arm and said first slot in said rear panel of said bracket and a screw hole in a support bracket of said electrical outlet thereby facilitating said mounting screw to be threaded into a screw hole in said electrical box until said foot on said slidably adjustable arm and said foot on said fixed arm is compressed against an exposed surface of said drywall panel.

* * * * *